(12) United States Patent
Wilks

(10) Patent No.: US 7,514,803 B2
(45) Date of Patent: Apr. 7, 2009

(54) TRAILER WITH INTEGRAL AXLE-MOUNTED GENERATOR AND BATTERY CHARGER

(76) Inventor: Paul L. Wilks, 217 Ben St., Cheasapeake, OH (US) 46019

( * ) Notice: Subject to any disclaimer, the term of this patent is extended or adjusted under 35 U.S.C. 154(b) by 301 days.

(21) Appl. No.: 11/465,231

(22) Filed: Aug. 17, 2006

(65) Prior Publication Data

US 2007/0051542 A1    Mar. 8, 2007

Related U.S. Application Data

(60) Provisional application No. 60/709,281, filed on Aug. 18, 2005.

(51) Int. Cl.
*F02B 63/04* (2006.01)
*H02K 5/00* (2006.01)
*B60K 1/00* (2006.01)
*B60K 6/00* (2006.01)

(52) U.S. Cl. ............. 290/1 A; 322/1; 180/65.3; 180/165; 180/65.5

(58) Field of Classification Search ........... 290/1 R, 290/1 A, 1 B, 40 B, 40 C, 2; 123/2; 322/1; 180/2.2, 65.3, 14.1, 165, 65.5; 280/423.1
See application file for complete search history.

(56) References Cited

U.S. PATENT DOCUMENTS

| | | | | |
|---|---|---|---|---|
| 704,573 A * | 7/1902 | Pintsch | ................. | 322/12 |
| 1,766,163 A * | 6/1930 | Vukosav | ................. | 180/14.1 |
| 2,159,885 A * | 5/1939 | Cullin | ................. | 322/1 |
| 3,826,322 A * | 7/1974 | Williams | ................. | 180/202 |
| 3,860,081 A * | 1/1975 | Moll et al. | ................. | 180/14.3 |
| 3,861,487 A * | 1/1975 | Gill | ................. | 180/65.3 |
| 3,972,380 A * | 8/1976 | Hudson et al. | ................. | 180/65.3 |
| 3,989,990 A * | 11/1976 | Thompson | ................. | 318/139 |
| 4,536,668 A * | 8/1985 | Boyer | ................. | 310/75 R |
| 4,657,289 A * | 4/1987 | Boyer | ................. | 290/1 R |
| 4,951,769 A * | 8/1990 | Kawamura | ................. | 180/65.4 |
| 5,178,403 A * | 1/1993 | Kemner et al. | ................. | 280/423.1 |
| 5,215,156 A * | 6/1993 | Stulbach et al. | ................. | 180/65.3 |
| 5,559,420 A * | 9/1996 | Kohchi | ................. | 180/68.5 |
| 5,680,907 A * | 10/1997 | Weihe | ................. | 180/2.2 |
| 5,701,062 A * | 12/1997 | Barrett | ................. | 318/51 |
| 5,767,663 A * | 6/1998 | Lu | ................. | 322/12 |
| 5,921,334 A * | 7/1999 | Al-Dokhi | ................. | 180/2.2 |
| 6,390,215 B1 * | 5/2002 | Kodama et al. | ................. | 180/65.3 |
| 7,102,245 B2 * | 9/2006 | Duggan et al. | ................. | 290/1 R |
| 7,147,070 B2 * | 12/2006 | Leclerc | ................. | 180/14.2 |

(Continued)

FOREIGN PATENT DOCUMENTS

GB    2101813 A  *  1/1983

*Primary Examiner*—Julio Gonzalez
(74) *Attorney, Agent, or Firm*—Frost Brown Todd

(57) ABSTRACT

A working surface incorporates a means for transferring mechanical energy produced by a rotating member of the working surface so that the energy rotates a shaft attached to an alternator that charges a bank of 12 V batteries. The alternator is responsible for converting the mechanical energy being input by the rotating shaft to electrical energy that is fed to the batteries. The batteries transfer the energy into an inverter for use depending upon the required amount. Thereby, backup electrical power may be generated and stored, taking advantage of excess horsepower at cruise provided by a vehicle as well as better utilizing travel time. Additionally, the added cost of ownership and noise of a portable power generator is avoided.

9 Claims, 3 Drawing Sheets

U.S. PATENT DOCUMENTS

| | | |
|---|---|---|
| 7,235,891 B2 * | 6/2007 | Tokiwa et al. ............ 290/10 |
| 7,325,638 B1 * | 2/2008 | Belloso ............ 180/69.6 |
| 2004/0012205 A1 * | 1/2004 | Sua-An ............ 290/40 C |
| 2006/0014063 A1 * | 1/2006 | Kokubo ............ 429/23 |
| 2007/0187957 A1 * | 8/2007 | Harrison ............ 290/1 R |

* cited by examiner

TRAILER WITH INTEGRAL AXLE-MOUNTED GENERATOR AND BATTERY CHARGER

CROSS REFERENCE TO RELATED APPLICATIONS

The present application claims the benefit of commonly-owned U.S. Pat. Appln. Ser. No. 60/709,281, "Trailer with Integral Axle-Mounted Generator and Battery Charger" to Wilks, filed Aug. 18, 2005, the disclosure of which is hereby incorporated by reference in its entirety.

BACKGROUND OF THE INVENTION

The present invention relates to electrical power generation and storage devices for portable or emergency use. While portable electrical generators are quite useful for emergency situations or austere environments, such generators tend to be inconvenient with regard to maintenance, transport, duration, and reliability. Consequently, a significant need exists for a more convenient and cheaper method of providing back-up electrical power.

Various kinds of portable generators exist in the current market. The uses for these generators range from home use to industrial use. Conventional portable generators comprise an engine and an alternator driven by the engine to produce electricity. Specifically, the spark-ignited combustion engine produces mechanical drive to rotate a crankshaft. The crankshaft, connected with a revolving shaft of the generator, will produce electrical current by converting the mechanical power produced by the engine into electrical energy. The mechanical energy drives the crankshaft to rotate electrically conductive elements within a magnetic field. The rotation of the electrically conductive elements around the field produces electric energy capable of being used or stored.

A more desirable form of energy storage is extremely valuable as a result of the continual rise of fuel prices, the concern for the environment, and the decline of the amount of fossil fuels. A portable power source that can produce electrical energy by converting mechanical energy would help reduce the cost of energy, protect the environment, and provide a reliable, convenient source of energy. The traditional portable electric generators consume gasoline to produce the mechanical drive necessary to rotate the electrically conductive elements. By contrast, using a rotating axle coupled with a gear system or other means would provide the necessary mechanical drive to produce electrical energy as opposed to wasting other energy sources and utilizing a portion of the power of a vehicle that would otherwise be unused.

A more efficient approach as stated earlier would be to use a mechanical drive system already being used, such as the wheel axle of a towed vehicle or a drive system of a car, to effectuate the rotation of the shaft of an alternator. This rotation of the shaft by means including but not limited to gears, pulleys, and transmissions will produce electric power capable of being stored within a single battery or a series of batteries. The power may then be converted by an inverter from direct current to alternating current as desired by the user.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF EMBODIMENTS OF THE INVENTION

Figure 1:
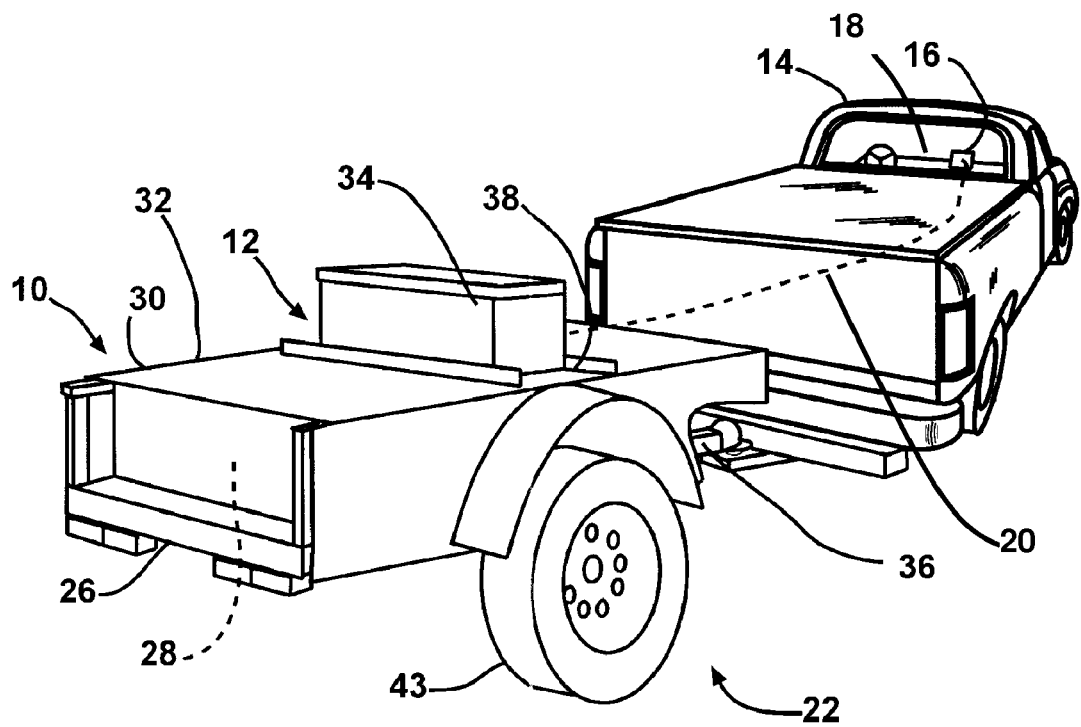
FIG. 1 depicts an isometric view of a towable work surface incorporating a wheel-driven electrical power generation and storage system consistent with aspects of the present invention with an inverter box stowed on a forward portion of the work surface.
Figure 2:
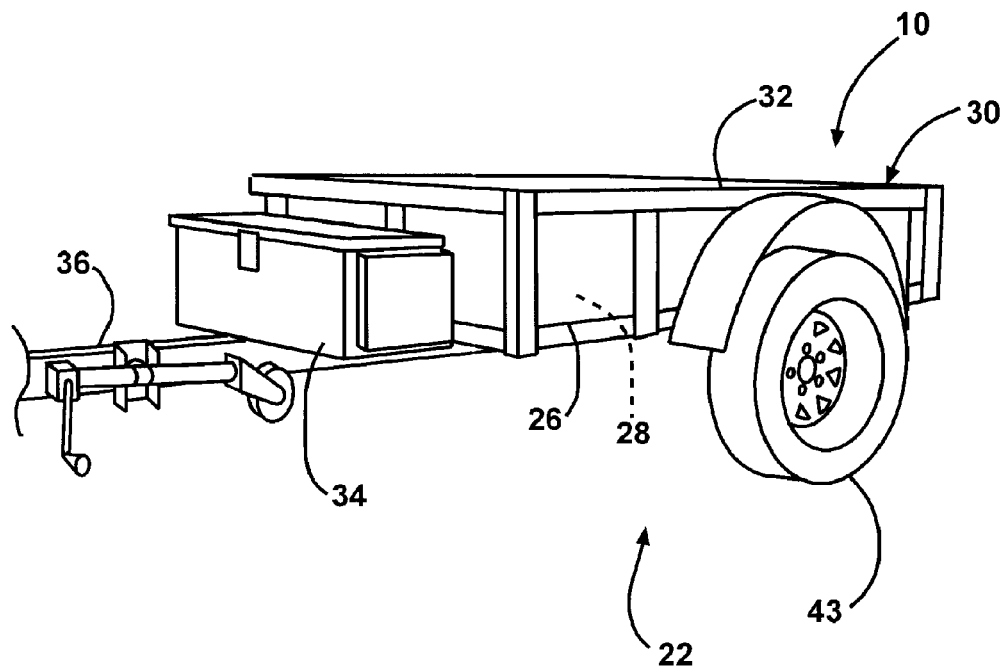
FIG. 2 depicts an aft isometric view of the towable work surface of FIG. 1 hitched to a vehicle with the inverter box mounted on a top surface of the towable work surface.

Referring now to the drawings in detail, wherein like numerals indicate the same elements throughout the views, FIGS. 1-4 show the apparatus comprising a towable working surface depicted as a single-axle trailer 10 that advantageously incorporates a wheel-driven electrical power generation and storage system 12 such that when being pulled by a vehicle 14, a driver may monitor an emergency power supply status display 16 attached to a dashboard 18. A wired or wireless connection 20 back to a trailer portion 22 of the system 12 communicates whether the wheel speed is within an optimum range for power generation and a level of stored charge of the system 12.

The trailer portion 22 includes a generally known trailer that has a lower deck 26 upon which a plurality of electrical power storage components (e.g., chemical batteries) 28 are supported. A table portion 30 is mounted overtop of the lower deck 26 to encompass the batteries 28 and to provide a work surface 32 so that the trailer portion 22 may serve additional purposes rather than merely generating and storing electrical power. In particular, an inverter box 34 may be stowed on a front hitch portion 36 of the trailer 24 as in FIG. 2 or on a mid section receptacle 38 as depicted in FIG. 1 to provide a weather protected container for an inverter 34 (FIG. 4) that converts the charge to an alternating current (e.g., single phase 110 V) that may power tools or household appliances when emergency or portable power is required.

Figure 3:
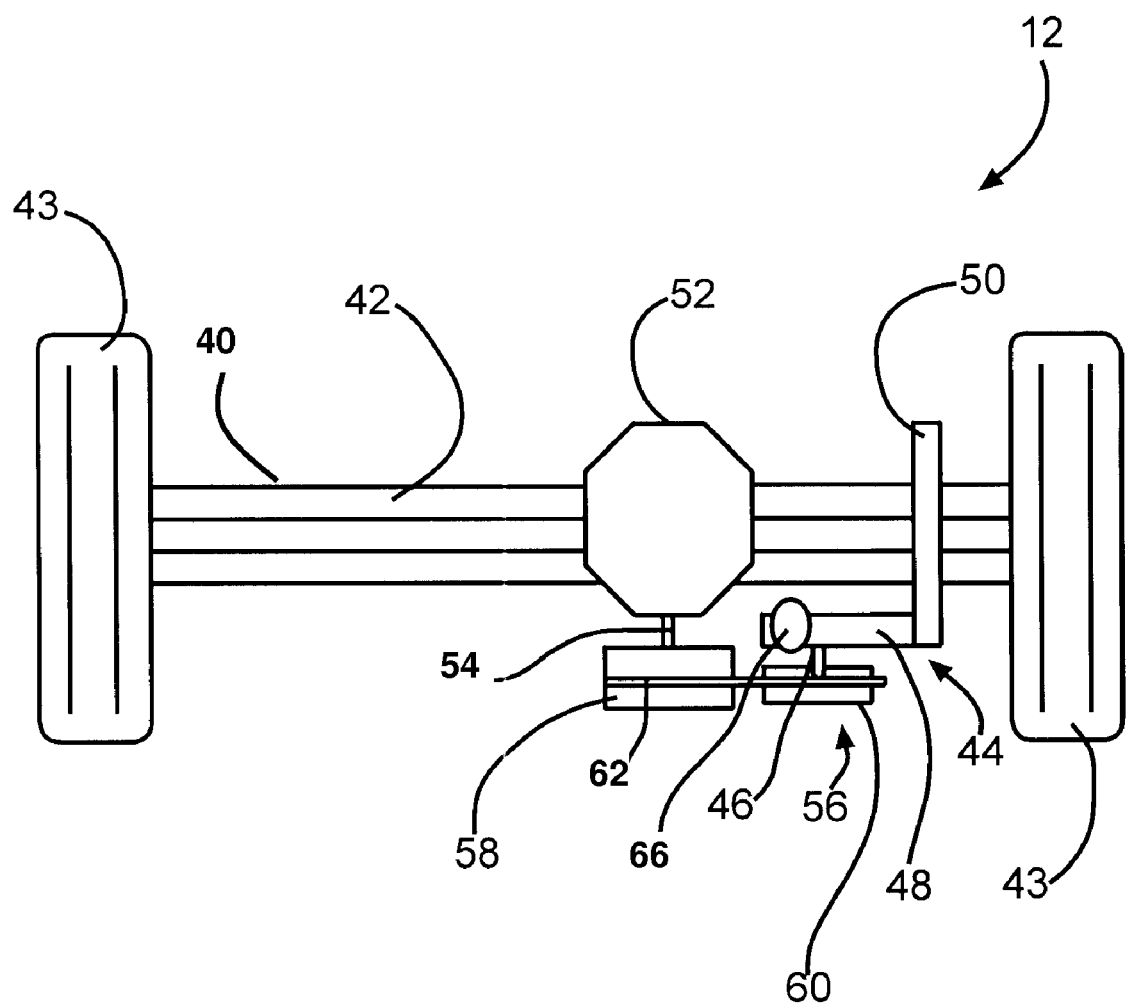
FIG. 3 depicts an aft view in elevation of an axle portion of the towable work surface of FIG. 1.

With particular reference to FIG. 3, the system 12 includes a rotating member (axle) 42 supported by a housing (40) and turned by wheels 43, which is coupled to a transmission member 44 and rotates a shaft 46 attached to an alternator 48 positioned by a mount 50. The rotation of the shaft 46 forces the alternator 48 to produce electric power by rotating electrically conductive elements within a magnetic field. The electric power produced by the alternator 48 may then be sent to one or more batteries 28 and ultimately converted by the inverter 34 from direct current ("DC") to alternating current ("AC").

The rotating member 42 provides the force that drives the shaft 46 attached to the alternator 48. In the illustrated version, the rotating member 42 is a wheel axle. Additionally, the rotating member 42 could be an object converting wind forces opposing the movement of the working surface 32 to produce rotation of the shaft 46. Other rotating surfaces may be apparent to those of ordinary skill in the art. One such system could incorporate a drive shaft in the vehicle to produce the movement necessary of the inverter 34.

The means for transferring the drive produced by the rotating member 42 to rotate the shaft 46 attached to the alternator 34 may encompass a range of transmissions, gears, or any other system apparent to those of ordinary skill in the art. In the illustrative version of FIG. 3, a ring 52 and pinion gear 54 of the axle 42 attached to the trailer 10 may be joined with a pulley system 56 to transfer the drive produced by the axle 42 to the shaft 46. A universal joint (not shown) that is typically attached to the pinion 54 is removed and replaced with the pulley system 56. As illustrated in FIG. 3, the pulley system 56 is depicted as a double v-belt comprising a rotating cylinder 58 connected to the pinion 54, a second rotating cylinder 60 and a belt 62. The rotation of cylinder 58 is driven by the pinion 54. The belt 62 attached to cylinder 58, rotates the second cylinder 60. Differing numbers of pulleys and gears may be used to accomplish the goal to produce the necessary means to transfer the force produced by the pinion 54 to the shaft 46. The pulley system 56 may advantageously serve as a ratio reducer or multiplier to maintain the shaft 46 within an optimum rotation range.

The alternator 48 converts the mechanical energy produced by the rotation of the shaft 46 into electrical energy. The availability of many different alternators 48 provides that alternators 48 may be substituted or varied depending upon their size and specifications. As seen in FIG. 3, the alternator 48 may be positioned adjacent to the v-belt pulley system 56. The alternator 48 should have a positive and negative terminal. The alternator 48 will then electrically connect to one or more batteries 28 to transfer and store the energy produced by the rotation of shaft 46.

Figure 4:
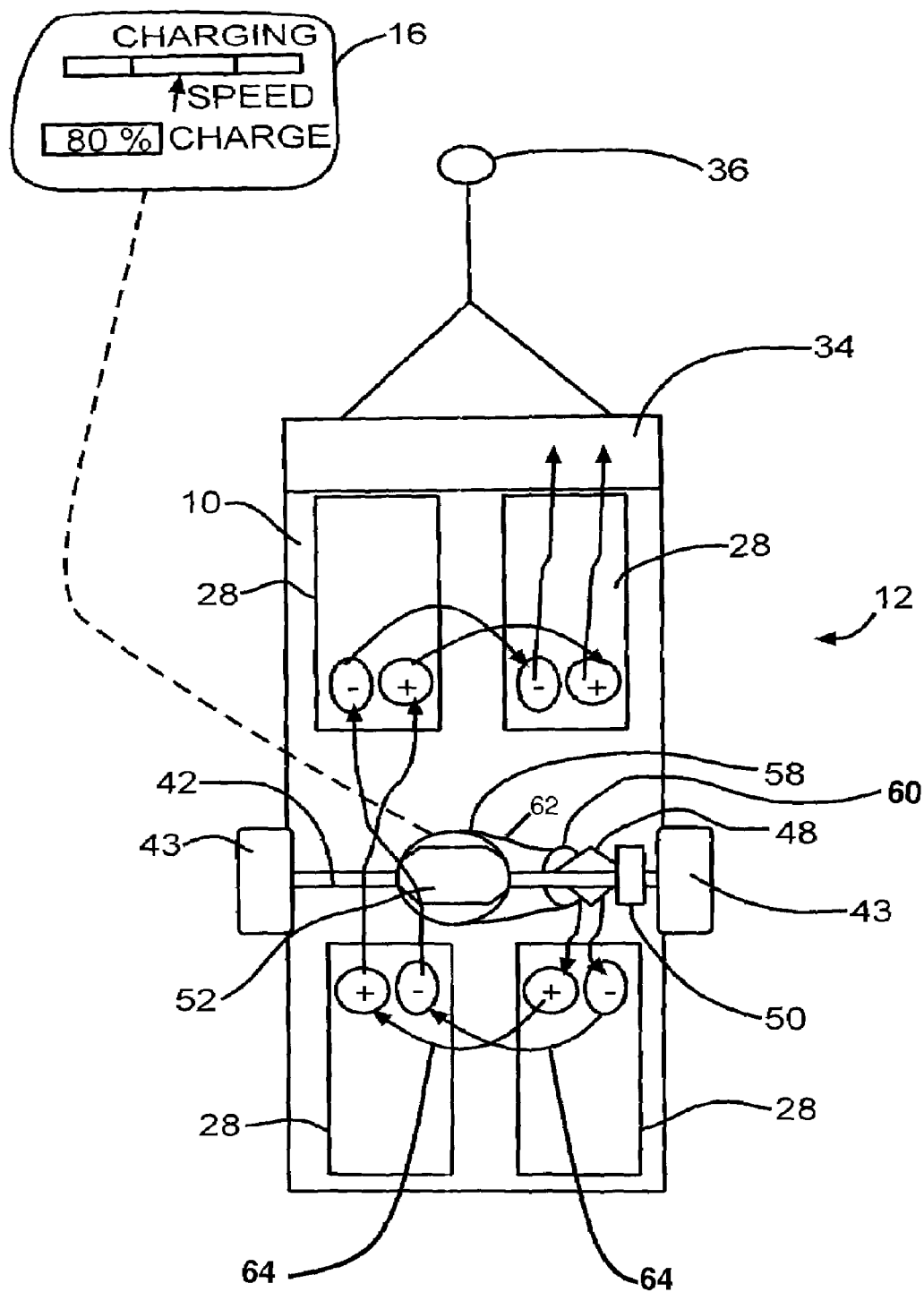
FIG. 4 depicts a top diagrammatic view of the towable work surface incorporating the wheel drive electrical power generation and storage system of FIG. 1.

While FIG. 4 represents a diagram of four batteries 28, there is no specific number of batteries required to operate the apparatus. The figures only illustrate one possible layout using four batteries 28. FIG. 4 represents one setup with wiring connections (battery cables) 64 for achieving the energy storage. Specifically, FIG. 4 depicts the use of four "8-D" batteries mounted on the trailer 10. Two #4 AWG watt battery cables 64 are attached to each battery 28. The alternator 48 should be wired to connect to a positive terminal of a battery 28. A ground wire should run from the alternator 48 to the remaining negative terminal of the battery 28. The type and number of batteries 28 will vary according to the application.

Positive and negative terminals of the series/parallel combination of batteries 28 connect to the inverter 34. The inverter 34 converts the direct current into alternating ("AC"). The illustrative version is a 30 A. (110 AC) inverter 34 that provides AC through a 30 A outlet or surge protector up to a total of 30 A due to the 30 A inverter. Additionally, one may choose to install a voltage regulator 66 that regulates the current going out of the alternator 48 in order to avoid overcharging the batteries 28. The voltage regulator 66 would force the rotating member (axle) 42, a ring 52 and pinion rear end gear 54 as seen in FIG. 3, to obtain a certain speed before activating the alternator 48. If the desired speed is not met, the batteries 28 may not charge.

Finally, while the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. An apparatus for storing electrical energy, comprising:
   (a) a trailer operable to be towed behind a vehicle wherein the trailer comprises:
      (i) a table portion comprising a working surface, wherein the working surface is operable to be used in conjunction with at least one tool,
      (ii) a lower deck comprising a storage area, wherein the storage area is configured to support at least one battery for storing electrical energy,
      (iii) a receptacle area configured to support at least one inverter,
      (iv) a first wheel operable to be rotated about a first axis,
      (v) a second wheel operable to be rotated about the first axis, and
      (vi) a housing comprising a wheel axle operable to be rotated about the first axis, wherein the wheel axle is turned in relation to a tow speed of the trailer, wherein the wheel axle is positioned between the first wheel and the second wheel, wherein the wheel axle comprises a center;
   (b) a ring and a pinion gear engaged with the wheel axle and supported by the housing, wherein the ring and pinion gear is supported by the housing such that the center of mass for the housing is proximate to the center of the axle, wherein the pinion comprises a first end and a second end, wherein the first end of the pinion is engaged with the ring, wherein the pinion is positioned substantially perpendicular to the wheel axle, wherein the rotation of the wheel axle is operable to cause rotation of the pinion via the ring;
   (c) a first pulley engaged with the second end of the pinion, wherein the first pulley comprises a diameter length, wherein the rotation of the pinion is operable to rotate the first pulley about the second end of the pinion;
   (d) a second pulley, wherein the second pulley comprises a diameter length, wherein the diameter length of the second pulley is smaller than the diameter length of the first pulley;
   (e) a belt engaged to the first pulley and the second pulley, wherein the rotation of the first pulley is operable to translate into movement of the belt, wherein movement of the belt is operable to rotate the second pulley;
   (f) an alternator coupled to the shaft, wherein the alternator comprises an input shaft having an exposed end, wherein the input shaft extends in a direction parallel to the pinion, wherein the exposed end of the input shaft is engaged with the second pulley, wherein rotation of the second pulley is operable to rotate the input shaft, wherein the smaller diameter length of the second pulley allows the input shaft to be rotated within an optimum rotation range;
   (g) at least one battery in electrical communication with the alternator to receive a charge wherein the at least one battery is positioned within the lower deck of the trailer, and
   (h) an inverter in electrical communication with the at least one battery, wherein the inverter is supported by the receptacle area.

2. The apparatus of claim 1, wherein the pulley is a v-belt pulley.

3. The apparatus of claim 1, wherein the wheel axle comprises multiple wheel axles turned in proportion to the tow speed of the trailer.

4. The apparatus of claim 1, wherein a voltage regulator is electrically attached to the alternator to control the alternator's ability to function.

5. An apparatus for storing electrical energy, comprising:
   (a) a trailer operable to be towed behind a vehicle, wherein the trailer comprises, (i) a working surface, wherein the working surface is operable to be used in conjunction with a tool requiring electrical power to operate
(ii) a lower deck positioned below the working surface, wherein the lower deck is configured to support at least one battery,
(iii) a plurality of wheels operable to be rotated in proportion to the speed of the trailer, wherein the wheels are configured to rotate about a first axis,
(iv) an axle positioned between the plurality of wheels, wherein the axle comprises a center, wherein the axle is configured to rotate about the first axis, and
(v) a housing comprising a center portion and supporting the axle, wherein any weight supported by the housing is distributed such that the center of mass for the housing is proximate to the center of the axle;
(b) a ring and pinion gear engaged with the axle, wherein the ring and pinion gear is supported by the center portion of the housing
(c) a first pulley engaged with the exposed end of the pinion, wherein the rotation of the pinion is operable to drive the rotation of the first pulley;
(d) a second pulley in communication with the first pulley wherein the second pulley comprises a diameter length and the diameter length of the second pulley is smaller than the diameter length of the first pulley;
(e) a belt engaged with the first pulley and the second pulley, wherein the belt is positioned substantially parallel to the wheel axle, wherein rotation of the first pulley translates into rotation of the second pulley via the belt;
(f) an alternator comprising a shaft wherein the shaft is engaged with the second pulley, wherein movement of the second pulley is operable to drive the rotation of the shaft, wherein the alternator is supported by a mount coupled to the housing;
(g) at least one battery in electrical communication with the alternator to receive a charge, wherein the battery is positioned within the lower deck of the trailer; and
(h) an inverter in electrical communication with the at least one battery, wherein the inverter is supported by the trailer.

6. The apparatus of claim 5, wherein a voltage regulator is electrically attached to the alternator.

7. An apparatus for storing electrical energy, comprising:
(a) trailer operatively configured to be towed behind a vehicle, wherein the trailer comprises a working surface and a lower deck;
(b) a wheel axle turned in relation to a tow speed of the trailer, wherein the wheel axle comprises a center, wherein the wheel axle is supported by a housing;
(c) a transmission engaged with the center of the wheel axle, wherein the transmission is supported by the housing such that the center of mass for the housing is proximate to the center of the wheel axle, wherein the transmission comprises:
  (i) a ring and pinion gear engaged with the wheel axle, wherein the ring is engaged with the wheel axle, wherein the pinion comprises a first end and an exposed end opposite the first end, wherein the first end of the pinion is engaged with the ring,
  (ii) a pulley system engaged with the exposed end of the pinion, wherein the pulley system is operable to translate rotation of the pinion, wherein the pulley system comprises a plurality of pulleys and at least one belt, wherein each pulley comprises a diameter length, wherein at least two of the pulleys comprise a different diameter length, wherein a first pulley is engaged with the exposed end of the pinion such that rotation of the first end of the pinion causes rotation of the first pulley, wherein a second pulley is in communication with the first pulley via a belt, wherein rotation of the first pulley causes rotation of the second pulley;
(d) an alternator comprising a shaft, wherein the shaft comprises an exposed end, wherein the exposed end of the shaft is engaged with the second pulley of the pulley system, wherein the rotation of the second pulley causes rotation of the exposed end of the shaft, wherein the difference in diameter length between at least two of the pulleys allows the shaft to be rotated within a certain range
(e) at least one battery in electrical communication with the alternator to receive a charge, wherein the at least one battery is supported by the lower deck; and
(f) an inverter in electrical communication with the at least one battery, wherein the inverter is supported by the trailer;
wherein the trailer is operable to be portable and thus positioned proximate to a residence to provide power to a residence through the stored electrical power in the apparatus.

8. The apparatus of claim 7 wherein a voltage gauge is electrically attached to the inverter.

9. The apparatus of claim 7 wherein a voltage regulator is electrically attached with the alternator.

* * * * *

UNITED STATES PATENT AND TRADEMARK OFFICE
CERTIFICATE OF CORRECTION

PATENT NO. : 7,514,803 B2 Page 1 of 1
APPLICATION NO. : 11/465231
DATED : April 7, 2009
INVENTOR(S) : Paul L. Wilks It is certified that error appears in the above-identified patent and that said Letters Patent is hereby corrected as shown below:

Column 5:
Claim 5, clause (b), line 19, after "housing", please add a semicolon ";".

Claim 5, clause (d), lines 24-26, please delete the phrase "wherein the second pulley comprises a diameter length and the diameter length of the second pulley is smaller than the diameter length of the first pulley".

Claim 7, clause (a), line 45, before "trailer" please add an "a".

Column 6:
Claim 7, clause (d), line 33, after "range" please add a semicolon ";".

Signed and Sealed this

Thirtieth Day of June, 2009

JOHN DOLL
*Acting Director of the United States Patent and Trademark Office*